(12) United States Patent
Rapoza

(10) Patent No.: US 7,003,370 B2
(45) Date of Patent: Feb. 21, 2006

(54) METHOD OF SYMMETRICALLY LOCATING A PATTERN PIECE RELATIVE TO WORK MATERIAL HAVING A VARIABLE REPEAT PATTERN

(75) Inventor: Thomas John Rapoza, Vernon, CT (US)

(73) Assignee: Gerber Scientific International, Inc., South Windsor, CT (US)

( * ) Notice: Subject to any disclaimer, the term of this patent is extended or adjusted under 35 U.S.C. 154(b) by 0 days.

(21) Appl. No.: 10/948,489

(22) Filed: Sep. 23, 2004

(65) Prior Publication Data
US 2005/0065631 A1 Mar. 24, 2005

Related U.S. Application Data

(60) Provisional application No. 60/505,238, filed on Sep. 23, 2003.

(51) Int. Cl.
G06F 19/00 (2006.01)
(52) U.S. Cl. ...................... 700/135; 382/111
(58) Field of Classification Search ........ 700/130–132, 700/134–135; 382/111, 170, 294, 295; 83/29
See application file for complete search history.

(56) References Cited

U.S. PATENT DOCUMENTS

| | | | |
|---|---|---|---|
| 4,961,149 A | 10/1990 | Schneider et al. | |
| 5,333,111 A | 7/1994 | Chaiken et al. | |
| 5,487,011 A | 1/1996 | Chaiken | |
| 5,508,936 A * | 4/1996 | King et al. | 700/135 |
| 5,806,390 A * | 9/1998 | Pomerleau et al. | 83/29 |
| 5,975,743 A * | 11/1999 | Bercaits | 700/134 |
| 6,173,211 B1 * | 1/2001 | Williams et al. | 700/131 |
| 6,192,777 B1 * | 2/2001 | Williams et al. | 83/56 |
| 6,434,444 B1 * | 8/2002 | Herman, Jr. | 700/135 |
| 6,580,962 B1 | 6/2003 | Rapoza et al. | |

* cited by examiner

Primary Examiner—John J. Calvert
Assistant Examiner—Brian Kauffman
(74) Attorney, Agent, or Firm—Morgan & Finnegan, L.L.P.

(57) ABSTRACT

A method for symmetrically aligning a pattern piece relative to a work material defining a pattern with varying repeat dimensions. The method including selectively capturing first and second images of areal portions of the work material corresponding to respective first and second reference points on said pattern piece, displaying the first and second images adjacent one another, and moving the pattern displayed in one of the first and second images an adjustment distance, such that the pattern defined by the work material is substantially aligned with respect to first and second images. The position of the pattern piece is then moved relative to the work material proportional to the adjustment distance so that the first and second reference points are symmetrically aligned with respect to the repeating pattern. The images can also be rotated about an axis substantially perpendicular to or parallel with the plane of the work material.

13 Claims, 3 Drawing Sheets

METHOD OF SYMMETRICALLY LOCATING A PATTERN PIECE RELATIVE TO WORK MATERIAL HAVING A VARIABLE REPEAT PATTERN

CROSS REFERENCE TO RELATED APPLICATIONS

This application claims priority to U.S. Provisional Patent Application No. 60/505,238 filed on Sep. 23, 2003 and entitled "Method for Symmetrically Centering a Pattern Piece on Plaid or Stripe Materials with Varying Repeat Dimensions". The disclosure of the above-identified provisional application is incorporated herein by reference.

FIELD OF THE INVENTION

The present invention generally relates to positioning pattern pieces on sheet-type work material, and more particularly, is directed to a method for aligning a pattern piece relative to a work material defining a variable repeat pattern, so that end portions of the pattern piece are positioned symmetrically with respect to the pattern.

BACKGROUND OF THE INVENTION

During the mass production of articles made from sheet-type work material, such as fabric, one or more layers of fabric are typically spread onto what is referred to by those skilled in the art of fabric processing as a spreading table. The fabric is then moved, often via a conveyor, onto a support surface forming part of a work material processing apparatus like a cloth cutting machine. A cloth cutting machine can be used to cut the fabric into pattern pieces for use in garments, furniture or other articles.

Generally, the pattern pieces are positioned on the spread fabric in a spatial array of segments positioned in a cutting sequence. This spatial array of segments is referred to by those skilled in the art as a "marker." Usually markers are computer generated to optimize piece pattern density and thereby minimize the waste of fabric.

However, in a garment or upholstery cutting application, it is sometimes necessary to align a point on a garment or furniture segment with a particular point on the fabric. This is known in the industry as a "fabric match" or a "match to fabric". Often, a match to fabric is carried out so that a garment or furniture pattern piece is centered relative to a particular pattern defined by the fabric. Sometimes, a further requirement, is that the extremities or end portions of the pattern piece are also positioned symmetrical with respect to the pattern defined by the fabric. If the fabric involved has a uniform repeat pattern, then positioning a center point of a symmetrically shaped pattern piece at a center point of the pattern defined by the fabric will suffice to ensure that the end portions of the pattern piece are also symmetrical with respect to the pattern defined by fabric.

However, fabrics having a plaid or stripe repeat pattern normally are non-uniform in either a warp or weft direction with respect to the pattern defined by the fabric. Accordingly, if a pattern piece having symmetrical dimensions is positioned on a fabric by locating a center point of the pattern piece with respect to a plaid or stripe repeat pattern that is not uniform, and cut from the fabric, the resulting pattern piece may appear to be asymmetrical with respect to the pattern defined by the fabric when comparing certain portions of the pattern piece. For example, opposing end portions of a symmetrically shaped elongated pattern piece having a central point of the pattern piece centered with respect to a repeat pattern defined by a fabric may appear at the end portions thereof to be asymmetrical with respect to the repeat pattern due to variations in the repeat pattern defined by the fabric.

Prior art marker generating and cutting systems do not provide for establishing or adjusting a marker for ensuring symmetry with respect to associated portions of a pattern piece relative to a repeat pattern defined by the work material.

Based on the foregoing, it is the general object of the present invention to provide a method for positioning a pattern piece relative to sheet-type work material defining a repeat pattern that overcomes the problems and drawbacks of prior art methods.

SUMMARY OF THE INVENTION

The present invention provides a method for symmetrically aligning a pattern piece relative to a work material defining a pattern with varying repeat dimensions. A work material processing apparatus is provided that defines a support surface adapted to carry at least one layer of sheet-type work material thereon.

Means for selectively capturing images of areal portions of the work material are employed to provide images of portions of the work material in response to commands issued from a controller in communication therewith. A display is also in communication with the controller for projecting images received by the controller in response to commands issued therefrom. The controller receives marker signals corresponding to an array of pattern pieces. The marker signals including first and second reference signals corresponding to first and second reference points respectively that correspond to first and second portions of the pattern piece. The pattern piece to be positioned relative to the work material such that the first and second portions are aligned substantially symmetrically with respect to the pattern defined by the material. The controller is programmed to analyze the marker to be registered with the work material and the pattern defined thereon, as well as the images received from the means for selectively capturing images.

In performing the above-referenced method, the means for selectively capturing images is operated to capture a first image of the work material in the area surrounding and including the first reference point and a second image of the work material in the area surrounding and including the second reference point where the pattern piece is initially positioned with respect to the work material. The images of the work material at the first and second reference point are then displayed, one adjacent the other. Next, one of the images of the work material at the first reference point, and the work material at the second reference point is moved relative to the other until the patterns on each of the first and second images are aligned one with the other. Subsequently, the position of the pattern piece within the marker and relative to the work material is adjusted in accordance with the adjustment made to the images so that the pattern piece is positioned with respect to the work material such that the location of the first and second portions of the pattern piece are symmetrically aligned with respect to the pattern defined by the work material.

The foregoing and still other objects and advantages of the present invention will be more apparent from the detailed explanation of the preferred embodiments of the invention in connection with the accompanying drawings wherein throughout the figures, like reference numerals describe like elements of the invention.

DETAILED DESCRIPTION OF PREFERRED EMBODIMENTS OF THE INVENTION

Figure 1:
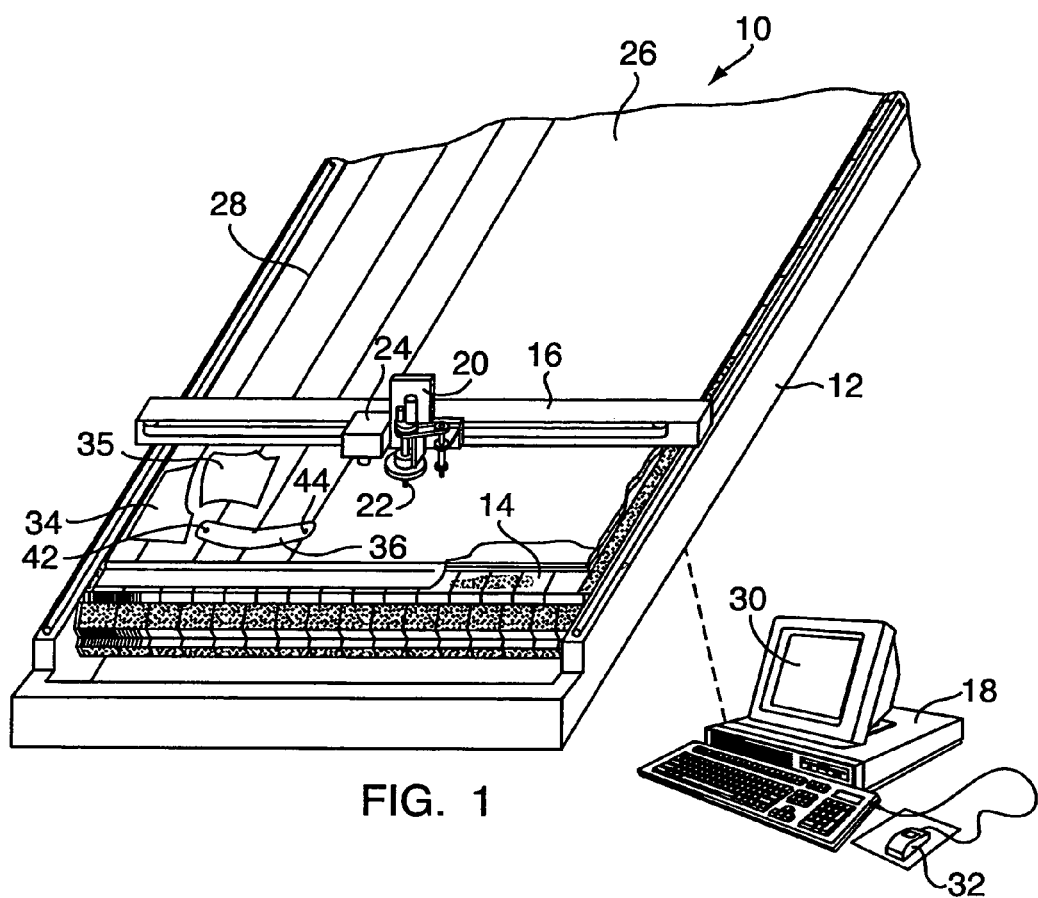
FIG. 1 is a perspective view of a cloth cutting apparatus having a layer of sheet-type work material defining a pattern thereon positioned on a cutting table.

Referring to FIG. 1, a sheet-type work material processing apparatus generally designated by the reference number 10 and depicted in the illustrated embodiment as a cloth cutting machine, defines a frame 12 having a support surface 14 carried thereon. The cutting machine 10 also includes a beam 16 extending transversely across the support surface 14 and moveable back and forth in a longitudinal direction thereof in response to command signals generated and issued by a controller 18 in communication with a cutting apparatus. A cutting head 20 having a cutting tool 22 such as a reciprocating blade is mounted to the beam 16 for movement longitudinally thereof also in response to command signals generated and issued by the controller 18. A camera 24 is attached to the cutting head 20 and moves with the cutting head for capturing images of a layer of sheet-type work material 26 defining a pattern 28 thereon. In the illustrated embodiment, the pattern 28 is a striped pattern with varying repeat dimensions, such that the distance between each stripe may not be uniform.

A display 30 shown in the illustrated embodiment as a computer type monitor is in communication with the controller 18 as is the camera 24. While the controller 18 has been shown in the illustrated embodiment as a PC type computer, the present invention is not limited in this regard as any type of controller capable of being programmed to receive signals from a camera, or sensors in general, and to send an image received to a display such as a programmable logic controller can be substituted without departing from the broader aspects of the present invention. In addition, while a computer type monitor has been shown and described in the illustrated embodiment the present invention is also not limited in this regard, as any type of display device capable of displaying an image of areal portions of the spread work material 26 can be substituted without departing from the broader aspects of the present invention.

The controller 18 is programmed to operate the beam 16 and the cutter head 20 to move them across the surface of the work material 26 carried by the support surface 14 so as to carry out both image capturing and cutting operations. In addition, the controller is programmed for receiving marker signals corresponding to an array of pattern pieces 34–36 located with respect to the work material 26. These marker signals further including reference signals corresponding to reference points identified on the pattern pieces. The controller is also provided with further information corresponding to the marker to be registered with the work material 26 positioned on the support surface 14 and the pattern 28 defined thereon, as well as for analyzing images received from the camera 24.

Figure 2:
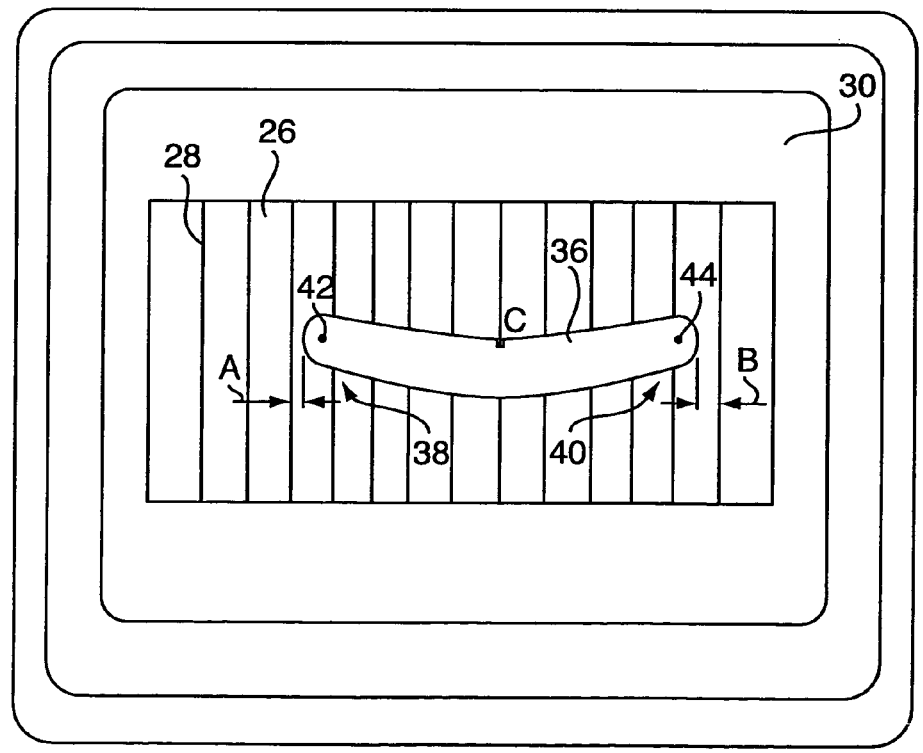
FIG. 2 is a schematic representation of an image of a pattern piece positioned relative to a work material wherein end portions of the pattern piece are not symmetrically aligned with a pattern defined by the work material.

Referring again to FIG. 1, during an alignment operation, the beam 16 and the cutter head 20 are caused to move in response to commands issued from the controller 18. Since the camera 24 is coupled to the cutter head 20, it too moves with the beam 16 and the cutter head. As set forth above, for certain pattern pieces such as the elongated pattern piece 36, it may be required to position the pattern piece relative to the work material 26 such that each of opposing end portions thereof are located symmetrically with respect to the pattern 28 on the work material. As illustrated in FIG. 2, even though a center point "C" of the pattern piece 36 is aligned with a stripe of the pattern 28, the end portions of the pattern piece, generally referred to by the reference numerals 38 and 40 are not positioned symmetrically with respect to the stripes of the pattern 28. As shown in FIG. 2, the distance A is less than that of the distance B. This is due to varying repeat dimensions in the pattern 28 defined by the work material.

As described above, normally the pattern piece 36 is initially located within a marker such that a center point C is centered relative to a design of the pattern 28 defined by the work material. This location is then adjusted in accordance with the method of the present invention so that certain associated portions of the pattern piece 36 are symmetrically located relative to the pattern defined by the work material.

Figure 3:
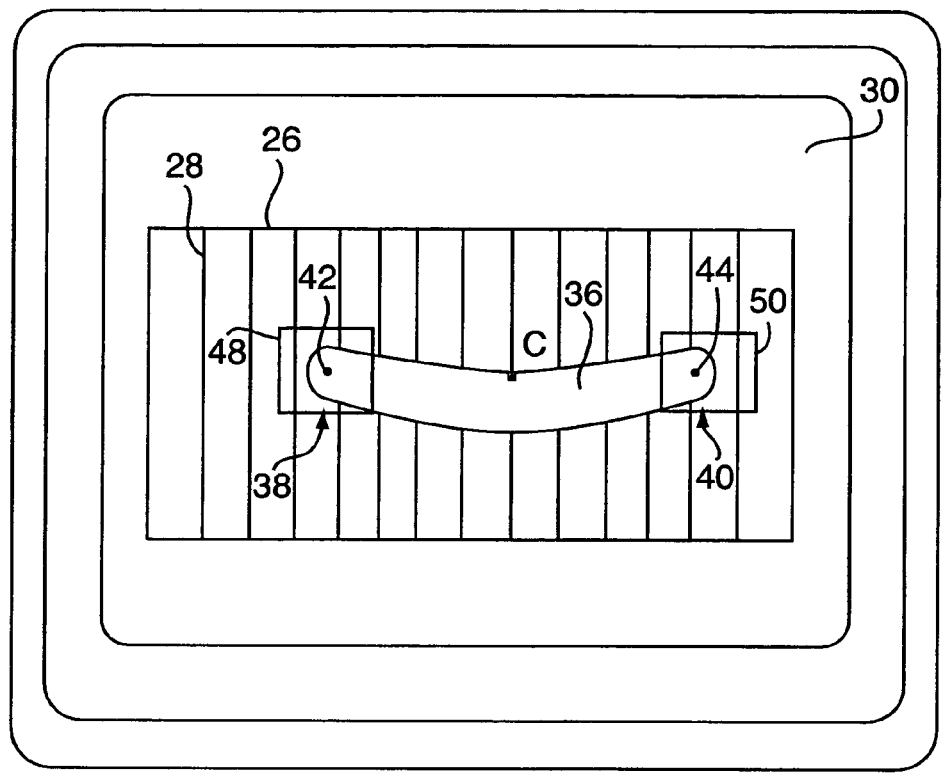
FIG. 3 is a schematic representation of the location of first and second images of respective end portions of the pattern piece of FIG. 2.

To adjust the location of the pattern piece 36 relative to the work material 26, as well as the marker, the camera 24 is first moved to a position over the work material corresponding to a first reference point labeled 42 in the illustrated embodiment and corresponding to a point within or coincident with the end portion 38 of the pattern piece 36. An image 48 (shown in FIG. 3) of the work material 26 in this area is captured by the camera 24. The camera 24 generates signals corresponding to the captured image 48 of the work material 26 and transmits them to the controller 18. The camera 24 is next moved to a position over a second reference point, labeled 44 in the illustrated embodiment, and corresponding to a point within or coincident to the end portion 40 of the pattern piece 36. Again, the camera 24 generates signals corresponding to the captured image 50 of the work material 26 and transmits them to the controller 18. As set forth above, the relationship between the first and second reference points 42, 44 is such that in the finished garment corresponding to the pattern piece 36, the first and second portions of the pattern piece associated with the first and second reference points respectively, must be located symmetrically with respect to the pattern 28 in either a warp or weft direction. Accordingly, the first and second reference points are predetermined with respect to the first and second portions of the pattern piece 36.

Figure 4:
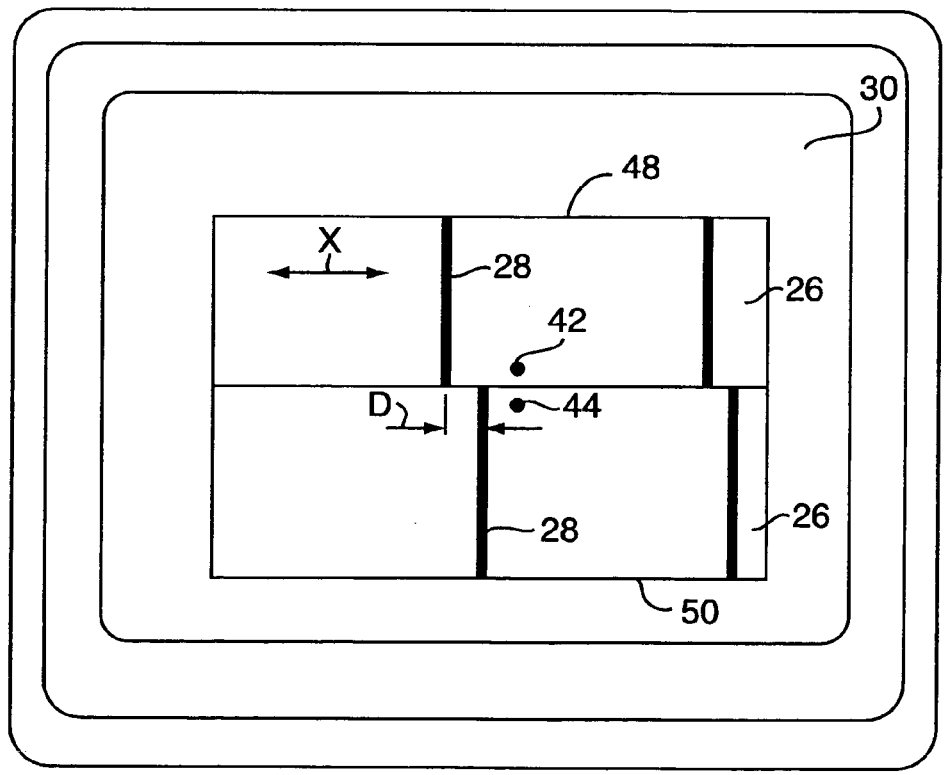
FIG. 4 is a schematic representation of enlarged portions of the first and second images of FIG. 3 shown positioned one over the other. The portion of one of the first and second images is shown rotated approximately 180 degrees about an axis substantially perpendicular to a plane of the work material.

Turning now to FIG. 4, portions of the first and second images 48 and 50 in the areas of first and second reference points 42 and 44 respectively, are projected, via signals generated by the controller 18, and displayed one over the other, onto the display 30. In the FIG. 4 embodiment, a portion of the image 48 of the work material 26 in the area of the first reference point 42 is rotated approximately 180 degrees about an axis substantially perpendicular to a plane of the work material and displayed over the image 50 of the work material 26 in the area of the second reference point 44 such that the first and second reference points are aligned. As can be seen in FIG. 4, the first reference and second reference points 42 and 44 respectively, are asymmetrical with respect to the pattern 28 defined by the work material 26. Accordingly, to adjust the alignment of the pattern piece 36 with respect to the pattern defined by the work material 26, an operator, via a pointing device, such as, but not limited to a mouse 32 in communication with the controller 18, moves the pattern 28 in a direction indicated in the illustrated embodiment by the arrows labeled "X", in one of the images 48 and 50, an adjustment distance D relative to the other, such that the lines of the pattern 28 are aligned in the first and second images. The controller 18 then analyzes the movement of the portion of the images 48 and 50 relative to one another and determines the amount and direction in which the pattern piece 36 in the marker must be moved to obtain proper alignment of the pattern defined by the work material with respect to the reference points 42 and 44. In the illustrated instance, the controller 18 moves the pattern piece 36 a distance of approximately one-half of the adjustment distance D in a direction corresponding to the X direction such that the end portions 38 and 40 as well as the associated reference points 42 and 44 of the pattern piece are symmetrically aligned with respect to the pattern 28. Thus, the pattern piece 36 is moved with respect to the marker as well as the work material 26. While manual alignment has been described, the present invention is not limited in this regard as the controller can also be operated to perform an automatic alignment without departing from the broader aspects of the present invention.

Figure 5:
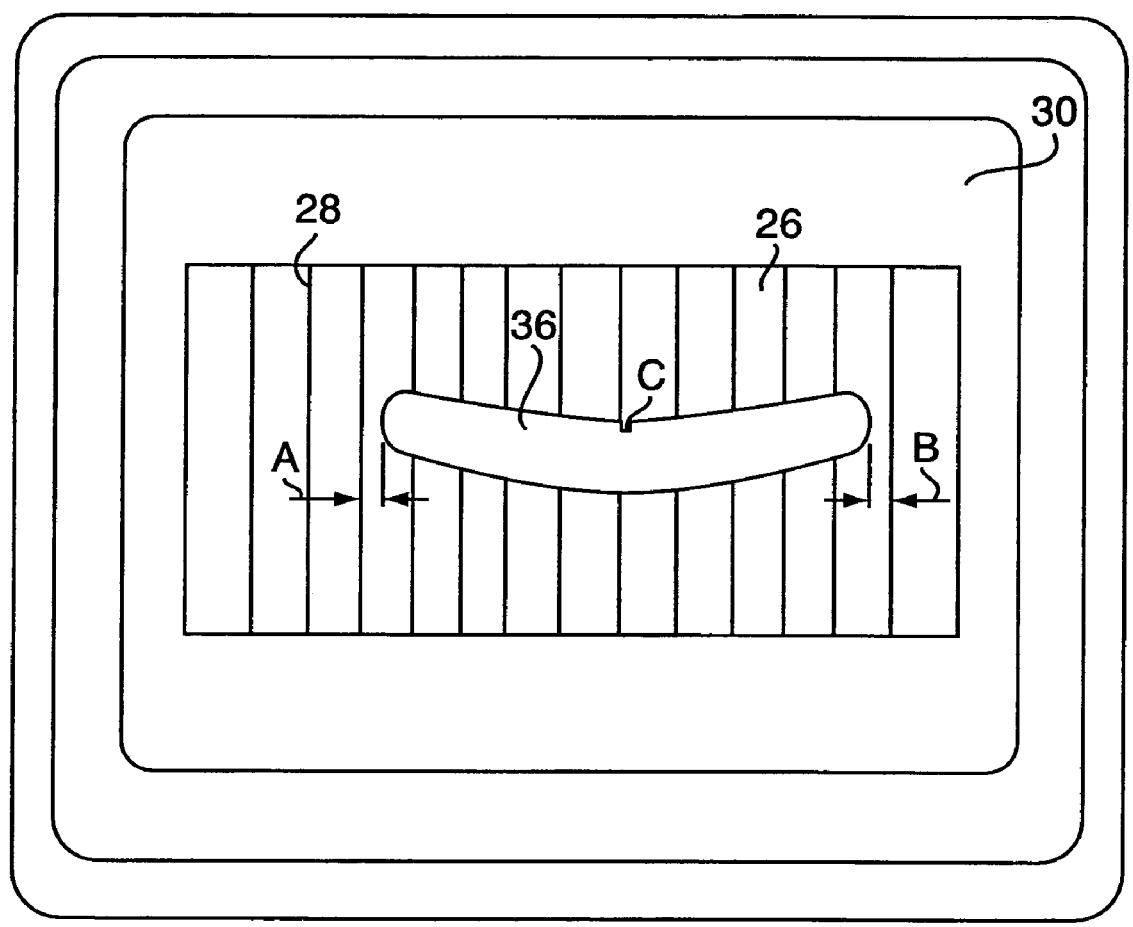
FIG. 5 is a schematic representation of an image of the pattern piece of FIG. 2 shown an adjusted position relative to the work material in accordance with the present invention, such that the end portions of the pattern piece are symmetrically aligned with the pattern defined by the work material.

As shown in FIG. 5, after the above-identified adjustment, the distance A is approximately equal to the distance B, as the pattern piece 36 is symmetrically aligned with the pattern 28 at the first and second reference points 42 and 44 and the respective end portions 38 and 40 thereof. As also evident in FIG. 5, the center point, C of the pattern piece 36 has been moved to the right (from the perspective of one viewing FIG. 5) with respect to the pattern 28 an amount equal to approximately one-half of the adjustment distance D shown in FIG. 4.

As described above and illustrated in FIG. 4, only a portion of the images 48 and 50 are displayed one over the other on the display 30 with one of the images rotated approximately 180 degrees about an axis substantially perpendicular to the plane of the work material. However, the present invention is not limited in this regard. In fact, the whole image 48 of the work material 26 in the area of the first reference point 42 can be displayed adjacent to, the whole image 50 of the area of the second reference point 44. Additionally, a portion of the first image 48 can be displayed adjacent to, the whole of the second image 50 or vice versa. Also, depending on the pattern 28 or the position of the first and second reference points 42 and 44 relative to the pattern piece 36, one or both of the images 48 and 50 can be rotated about an axis substantially perpendicular to or parallel with the plane of the material. Furthermore, a portion of the first or second image can be rotated and displayed adjacent to the other of the first and second images so that viewing and alignment of portions of the pattern piece with respect to the pattern 28 can be readily ascertained and adjusted. Additionally, both of the images or portions thereof can be rotated approximately 90 degrees about an axis substantially perpendicular to or parallel with the plane of the work material so that the alignment of the pattern 28 with respect to the first and second reference points can be viewed and adjusted as required.

Accordingly, the above-described alignment process is repeated with any remaining pattern pieces in the marker that requires symmetrical alignment with the pattern at associated locations or portions of the pattern piece.

While preferred embodiments have been shown and described various modifications and substitutions may be made without departing from the spirit and scope of the invention. Accordingly, it is to be understood that the present invention has been described by way of example and not by limitation.

What is claimed is:

1. A method for symmetrically aligning a pattern piece relative to at least one layer of sheet-type work material defining a variable repeat pattern, the method comprising the steps of:
   providing at least one layer of work material defining a variable repeat pattern;
   identifying an initial position of the location of said pattern piece relative to said work material;
   identifying the location of a first reference point corresponding to a first portion of said pattern piece and the location of a second reference point corresponding to a second portion of said pattern piece;
   capturing first and second images of areal portions of said work material adjacent to and including said first and second reference points respectively;
   displaying at least a portion of said first and second images of said work material adjacent one another;
   moving said pattern defined by said work material in one of said first and second images relative to the pattern defined by said work material in the other of said first and second images an adjustment distance, such that the pattern defined by said work material in said first image is substantially aligned with the pattern defined by said work material in said second image;
   adjusting the position of said pattern piece relative to said work material proportionally to said adjustment distance so that said first and second portions of said pattern piece are located symmetrically with respect to said pattern defined by said work material.

2. The method for symmetrically aligning a pattern piece relative to work material defining a variable repeat pattern according to claim 1, further comprising a step of rotating one of said first and second images about an axis substantially perpendicular to a plane of said work material.

3. The method for symmetrically aligning a pattern piece relative to work material defining a variable repeat pattern according to claim 2 wherein said step of displaying includes displaying at least a portion of said first and second images adjacent one another such that said first and second reference points are aligned one with the other.

4. The method for symmetrically aligning a pattern piece relative to work material defining a variable repeat pattern according to claim 1, further comprising a step of rotating one of said first and second images about an axis substantially parallel to a plane of said work material.

5. The method for symmetrically aligning a pattern piece relative to work material defining a variable repeat pattern according to claim 4 wherein said step of displaying includes displaying at least a portion of said first and second images adjacent one another such that said first and second reference points are aligned one with the other.

6. The method for symmetrically aligning a pattern piece relative to work material defining a variable repeat pattern according to claim 1, further comprising a step of rotating one of said first and second images approximately 180 degrees about an axis substantially perpendicular to a plane of said work material.

7. The method for symmetrically aligning a pattern piece relative to work material defining a variable repeat pattern according to claim 1, further comprising a step of rotating one of said first and second images approximately 180 degrees about an axis substantially parallel to a plane of said work material.

8. The method for symmetrically aligning a pattern piece relative to work material defining a variable repeat pattern according to claim 1, further comprising a step of capturing a third image of said work material at a center point of said pattern piece, wherein said step of adjusting the position of said pattern piece relative to said work material includes moving said center point approximately half of said adjustment distance.

9. The method for symmetrically aligning a pattern piece relative to a work material defining a variable repeat pattern according to claim 1, wherein said step of identifying the location of first and second reference points includes identifying first and second reference points coincident with first and second end portions of said pattern piece.

10. The method for symmetrically aligning a pattern piece relative to a work material defining a variable repeat pattern according to claim 1 wherein said step of displaying includes displaying said first and second images one over the other.

11. The method for symmetrically aligning a pattern piece relative to work material defining a variable repeat pattern according to claim 1, further comprising a step of splitting at least one of said first and second images of said work material into at least two partial images and displaying one of said partial images adjacent the other of said first and second images of said work material.

12. The method for symmetrically aligning a pattern piece relative to work material defining a variable repeat pattern according to claim 1 wherein said step of displaying said first and second images further includes splitting each of said first and second images of said work material into at least two partial images and displaying one of said partial images of said first image adjacent a corresponding one of said partial images of said second image.

13. The method for symmetrically aligning a pattern piece relative to work material defining a variable repeat pattern according to claim 1 wherein said step of identifying an initial position of the location of said pattern piece relative to said work material includes a step of centering a center point of said pattern piece with respect to said repeat pattern defined by said work material.

* * * * *